United States Patent [19]

Krishnan

[11] 3,992,502
[45] Nov. 16, 1976

[54] METHOD FOR USING MOLD RELEASE
[75] Inventor: Ram M. Krishnan, Akron, Ohio
[73] Assignee: The Goodyear Tire & Rubber Company, Akron, Ohio
[22] Filed: Apr. 28, 1972
[21] Appl. No.: 248,361

[52] U.S. Cl. .............................. 264/129; 264/337; 264/338
[51] Int. Cl.$^2$ ......................................... B29C 1/04
[58] Field of Search .................... 264/337, 338, 129

[56] References Cited
UNITED STATES PATENTS

| | | | |
|---|---|---|---|
| 2,801,150 | 7/1957 | Koryta | 264/338 |
| 3,413,390 | 11/1968 | Heiss | 264/338 X |
| 3,726,952 | 4/1973 | Boden | 264/328 X |

FOREIGN PATENTS OR APPLICATIONS

| | | | |
|---|---|---|---|
| 165,180 | 1955 | Australia | 106/38.24 |

Primary Examiner—Richard R. Kucia
Attorney, Agent, or Firm—F. W. Brunner; J. D. Wolfe

[57] ABSTRACT

A polyurethane reaction mixture mold release comprising 1 to 5 percent by weight of a sodium or potassium soap of a carboxylic acid of 11 to 22 carbons in a diluent of alcohol or water, the mold release being applied to a mold, then addition of a polyurethane reaction mixture to form a shaped polyurethane of the microcellular type, stripping the shaped article from the mold, flushing with water at 40° to 95°C., drying, applying a paint coat of 3 to 10 mils over the polyurethane article to obtain a polyurethane decorative article having a paint coat resistant to peeling.

2 Claims, No Drawings

METHOD FOR USING MOLD RELEASE

This invention relates to a method of making shaped polyurethanes and applying a nondiscoloring polyurethane coat to the shaped polyurethane. More particularly, this invention relates to a method of making a shaped microcellular polyurethane article with a nondiscoloring coating thereon.

In making shaped polyurethanes it is necessary to use a shaper such as a mold or an extruder. Since the shaper tends to adhere to the polyurethane reaction mixture during the shaping it has been the general practice to treat the surface of the shaper with a mold release agent. These release agents have been used very widely and in general have been such materials as waxes, polyethylene and polypropylene. Although water-insoluble metallic soaps are taught by the literature, they have not been accepted commercially to the best of my knowledge. Unfortunately, when it has been attempted to apply a nondiscoloring polyurethane coating over the shaped polyurethane article to give an article which is essentially nondiscoloring when exposed to sunlight, it has been found that the nondiscoloring polyurethane coat or paint, which was applied over the shaped polyurethane, tends to become disengaged from the shaped polyurethane surface due to the failure to obtain a satisfactory bond. Heretofore it has been the practice to remove the mold release agent such as polyethylene or wax by treating the surface of the shaped polyurethane article with a suitable solvent such as methylene chloride or trichloro ethylene, ketones and related solvents. It has been the experience that these solvents tend to disrupt or damage the surface of the shaped polyurethane article during the removal of the mold release agent and also require use of relatively expensive equipment to control the solvent loss. Also, even this severe vapor solvent treatment has not been entirely satisfactory in eliminating paint peel.

It is an object of this invention to provide a method of forming a shaped polyurethane article which may be removed from the shaper and be water washed and dried to give a shaped polyurethane article that will readily accept a nondiscoloring polyurethane coating or a paint coat and yet be free of the tendency to bleed or flaking off of the coating as has heretofore been associated with polyurethane articles of this nature.

This object and other objects of this invention may be achieved by coating the surface of the shaper with a diluent solution of a sodium or potassium soap of a carboxylic acid having the structure

where n is 11 or greater, with the upper limit being about 22 carbon atoms and M is sodium or potassium. The release is used preferably as an aqueous solution or alcoholic solution, or their mixture. Then the polyurethane reaction mixture is brought into contact with the shaper to obtain a shaped polyurethane article. The shaped polyurethane article is removed from the shaper, washed with water of at least 60° C. but less than the boiling point, i.e., approximately 95° C. of water to remove any adhered mold release agent. The cleaned, shaped polyurethane is dried, preferably for about 10 to 30 minutes at 120° to 160° C. and then at least one coat of a suitable coating material or paint such as a nondiscoloring polyurethane is applied over the shaped polyurethane to give it protection against discoloration when exposed for the equivalent of 3000 hours in an infrared Fadeometer.

The release agent is prepared by making a mixture of 1 to 5 percent by weight of the soaps of sodium or potassium carboxylate where the carboxylate contains from 12 to 25 carbon atoms in admixture with a diluent of 100 to 95 percent by weight of an alcohol selected from methanol, ethanol and propanol or an alcohol and water mixture, where the water is 0 to 30 percent of the diluent. Satisfactory handling characteristics are obtained with the aqueous mixture where the soap level is 1 to 5 percent and the alcohol level is 99 to 95 percent. When the alcohol level in the alcoholwater diluent is less than about 25 percent the mixture is nonflammable. Representative soaps of the above formula useful in this invention are the sodium and potassium soaps of the fats and vegetable oils such as sodium and potassium oleate or stearate and their impure mixture obtained by saponification of fatty acids having 12 to 25 carbon atoms.

The specific and representative nature of this invention is illustrated further by the following representative embodiments, where all parts and percentages are by weight unless otherwise indicated.

EXAMPLE I

A microcellular polyurethane was cast in an automobile bumper mold. The mold was spray coated with a sodium or potassium soap mixture to give a release barrier on the aluminum mold and allowed to dry before the microcellular polyurethane reaction mixture was added. The nature of microcellular polyurethane reaction mixture and the mold release is described in greater detail hereinafter.

The microcellular polyurethane reaction mixture reacted and foamed to give a cured foam on standing a half hour at 110° C. The microcellular polyurethane bumper was stripped from the mold and flushed with water at 75° C. for 1 minute to clean away the soap on the surface.

The microcellular bumper was dried at 65° C. to 95° C. for 15 to 20 minutes and then was spray painted with nondiscoloring polyurethane solution, i.e., a mixture of a methyl ethyl ketone solution of the prepolymer of polytetramethylene adipate and 4,4'-dicyclohexyl methane diisocyanate and isophorone diamine, 2,2',4,-4'-tetrahydroxybenzphenone and titanium dioxide to give a coating 3 to 10 mils thick. The coated bumper was allowed to dry overnight and then sections were cut from the bumper for peel tests. A tape peel test (a paint peel test) was run on these sections and there was no tendency for the tape to peel. On a control bumper which was flushed with water at 16° C. instead of 75° C. there was noticeable peeling of the coating when subjected to the tape peel test. The tape peel test was run by scribing the surface of the paint coat with a carbide tip scriber No. 90C, available from Aircraft Specialties, Inc., Post Office Box 98, Lapeer, Michigan 48446. The test sample has scribe lines drawn through the paint to the base material to lay off in the paint surface a checkerboard gridwork of 9 parallel lines spaced one-eighth inch apart in one horizontal direction and 8 parallel lines spaced one-eighth inch apart in the vertical direction. Then scribe lines are drawn diagonally in only one direction through the intersection of the two sets of parallel lines. A Minnesota Mining & Manufacturing Company No. 710 tape is applied over the gridwork by pressing firmly and removed with an upward pull at medium motion. Any observed chipping, flaking or general poor adhesion is noted after removal of the tape.

Table 1

| Recipe No. | 1 | 2 | 3 | 4 | 5 | 6 | 7 | 8 |
|---|---|---|---|---|---|---|---|---|
| Ingredients | | | | Parts | | | | |
| Sodium Oleate/Stearate | 1 | 2 | 3 | 1 | | | 1 | |
| Potassium Oleate/Stearate | | | | | 1 | 5 | | 1 |
| Methanol | 99 | 98 | 97 | | | 95 | | 24 |
| Ethanol | | | | 24 | 99 | | 24 | |
| Water | | | | 75 | | | 75 | 75 |

EXAMPLE II

Soap solutions were made by blending the ingredients with stirring and slight warming as needed to give a smooth non-gelled mixture for Recipe Numbers 1 to 8 of table 1. Then these soap solutions were used to treat a mold to build up a release coat thereon by spraying with an airless spray gun. The molds were at 60° C. at the time the soap solutions were applied and this temperature was sufficient to remove sufficient of the water and the alcohol to give a satisfactory release coat on the mold where the mold was metal such as steel or aluminum, epoxy resin, rubber and the usual polyurethane mold material. Then each of the aluminum, steel and epoxy powder molds, treated with one of its release coats 1 to 8 of Table 1 were used to form a microcellular part such as a wheel biscuit for a decorative automobile wheel by filling the mold with a microcellular polyurethane reaction mixture of the following composition:

| Ingredients | Parts |
|---|---|
| A polypropylene ether triol of 2000 molecular weight | 90 |
| 1,4-butane diol | 14 |
| Lead octoate | 0.125 |
| Triethylene diamine | 0.45 |
| Water | 0.64 |
| Quasi prepolymer of 15% of above triol and 85% toluene diisocyanate-30% Free NCO 102* | |

*Isocyanate index.

Successful release was obtained of the molded microcellular polyurethane wheel biscuits from each of the molds. The wheel biscuits were flushed with water at 95° C. and dried in a hot air oven at 75° C. for 15 minutes and then each biscuit was spray coated with a nondiscoloring paint (PPG - DEM-100 Enamel) and then baked at 110°–120° C. for 20 to 45 minutes. Each of the biscuits prepared using mold release prepared by Recipes No. 1 to 8 had satisfactory tape peel adhesion.

Although the above examples illustrate this invention with a polyether polyol, the polyester polyol, hydrocarbon polyols and other organic polyisocyanates can be used, too. Representative of these are those shown in the Frost Patent, 3,072,582, either with or without the auxiliary blowing agents thereof.

The illustrative polyurethane foams of this invention can be replaced with any of the polyurethane foamable reaction mixtures and the mold release of this invention will give satisfactory release and where skin or pore size is small enough to form a smooth noncrater paint coat thereon will give excellent resistance to peel. Any of the wellknown commercial paints recommended for painting polyurethanes can be used, as well as the nondiscoloring urethanes of U.S. patent application Ser. No. 467,115, filed June 25, 1965 to offer the advantage of a lower cost, release agent and greater freedom from build-up on the molds.

While certain representative embodiments and details have been shown for the purpose of illustrating the invention, it will be apparent to those skilled in this art that various changes and modifications may be made therein without departing from the spirit or scope of the invention.

What is claimed is:

1. A method of manufacturing shaped polyurethane articles having a paint coat, comprising coating a mold with a release agent comprising 1 to 5 percent by weight of a soap having the structure $C_nH_{2n-1}COOM$, where N is an integer having values of 11 to 22 and M is sodium or potassium ion, and 99 to 95 percent by weight of a diluent consisting of alcohol or alcohol and water with the amount of water varying from 0 to 24 percent by weight and the alcohol being selected from the group consisting of methanol and ethanol, adding a polyurethane reaction mixture to the mold and allowing it to react and cure, stripping the molded article from the mold, flushing the shaped polyurethane article with water at 40° C. to 95° C. to remove soap, drying the article and then applying a paint coat of 3 to 10 mils over the polyurethane article and drying the paint coat on said article.

2. In the method of manufacturing shaped polyurethane articles having a paint coat, of claim 1, wherein the paint coat exhibits freedom from peel when subjected to the tape peel test.

* * * * *